(12) United States Patent
Vulis et al.

(10) Patent No.: US 12,124,002 B2
(45) Date of Patent: Oct. 22, 2024

(54) BEAM DEFLECTOR METASURFACE

(71) Applicant: Apple Inc., Cupertino, CA (US)

(72) Inventors: Daryl I. Vulis, San Francisco, CA (US); Brandon J. Hui, Cupertino, CA (US); Christian Ocier, Cupertino, CA (US); Shang Wang, Cupertino, CA (US); Tong Chen, Fremont, CA (US); Zhenbin Ge, San Jose, CA (US); Runyu Zhang, Urbana, IL (US)

(73) Assignee: Apple Inc., Cupertino, CA (US)

( * ) Notice: Subject to any disclaimer, the term of this patent is extended or adjusted under 35 U.S.C. 154(b) by 80 days.

(21) Appl. No.: 17/466,813

(22) Filed: Sep. 3, 2021

(65) Prior Publication Data

US 2023/0070943 A1 Mar. 9, 2023

(51) Int. Cl.
*G02B 1/00* (2006.01)
*G02B 5/18* (2006.01)

(52) U.S. Cl.
CPC .......... *G02B 1/002* (2013.01); *G02B 5/1809* (2013.01)

(58) Field of Classification Search
CPC G02B 5/1809; G02B 5/1876; G02B 27/4288; G02B 27/42; G02B 5/1866;
(Continued)

(56) References Cited

U.S. PATENT DOCUMENTS 5,231,689 A 7/1993 Reidinger
6,349,159 B1 2/2002 Uebbing et al.
(Continued)

FOREIGN PATENT DOCUMENTS

CN 104380177 2/2015
CN 105531653 4/2016
(Continued)

OTHER PUBLICATIONS

Gelinck et al., "X-Ray Detector-on-Plastic With High Sensitivity Using Low Cost, Solution-Processed Organic Photodiodes," IEEE, 2015, pp. 1-8.
(Continued)

*Primary Examiner* — Jonathan Y Jung
(74) *Attorney, Agent, or Firm* — Brownstein Hyatt Farber Schreck, LLP (57) ABSTRACT

Configurations for a beam deflector metasurface are disclosed. The beam deflector metasurface may include beam deflectors arranged in a repeating, radial pattern of concentric zones. The beam deflector metasurface may be a large area, high numerical aperture metasurface optic with high efficiency when directing light at non-normal angles of incidence. The different concentric zones may direct received light in varying directions with various steepness of angles. The beam deflectors may include pillars that may be the same or different width, height, or shape. The pillars may function as diffractive gratings and the cross-coupling between the pillars may direct the output light. The zones of the beam deflector metasurface may allow for diffusing hot spots and spreading the light evenly over the target area. The beam deflector metasurface may be used for non-imaging applications where the deterioration of focus allows for better efficiency at non-normal input and output angles of incidence. The beam deflectors may be designed for polarization and wavelength sensitivity as well as allowing for multiple processing benefits such as patterning the beam deflectors onto active devices.

19 Claims, 8 Drawing Sheets

(58) Field of Classification Search
CPC ............ G02B 2005/1804; G02B 5/008; G02B 1/002; G02B 1/007; G02B 26/06; G02B 1/005; G02F 1/292; G02F 2202/30
See application file for complete search history.

(56) References Cited

U.S. PATENT DOCUMENTS

| | | |
|---|---|---|
| 6,529,661 B2 | 3/2003 | Kropp |
| 6,556,349 B2 | 4/2003 | Cox et al. |
| 6,586,776 B1 | 7/2003 | Liu |
| 6,910,812 B2 | 6/2005 | Pommer |
| 6,919,681 B2 | 7/2005 | Cok et al. |
| 6,946,647 B1 | 9/2005 | O'Neill et al. |
| 6,948,820 B2 | 9/2005 | Veligdan et al. |
| 7,021,833 B2 | 4/2006 | Loh |
| 7,071,615 B2 | 7/2006 | Lu et al. |
| 7,444,083 B2 | 10/2008 | Ohashi et al. |
| 7,495,272 B2 | 2/2009 | Maruyama et al. |
| 7,499,094 B2 | 3/2009 | Kuriyama |
| 7,518,462 B2 | 4/2009 | Kanno et al. |
| 7,540,645 B2 | 6/2009 | Kazakevich |
| 7,706,073 B2 | 4/2010 | Munro |
| 7,712,906 B1 | 5/2010 | Larimer |
| RE41,673 E | 9/2010 | Ma |
| 7,842,246 B2 | 11/2010 | Wohlstadter et al. |
| 8,077,393 B2 | 12/2011 | Steenblik |
| 8,305,400 B2 | 11/2012 | Otani |
| 8,310,413 B2 | 11/2012 | Fish et al. |
| 8,603,642 B2 | 12/2013 | Hatwar et al. |
| 8,624,853 B2 | 1/2014 | Han et al. |
| 8,625,058 B2 | 1/2014 | Kozuma et al. |
| 8,664,655 B2 | 3/2014 | Lee et al. |
| 8,743,027 B2 | 6/2014 | Wu et al. |
| 8,749,528 B2 | 6/2014 | Imai et al. |
| 8,780,065 B2 | 7/2014 | Ribeiro et al. |
| 9,007,349 B2 | 4/2015 | Tseng |
| 9,064,451 B2 | 6/2015 | Lynch et al. |
| 9,070,648 B2 | 6/2015 | de Jong et al. |
| 9,112,043 B2 | 8/2015 | Arai |
| 9,183,779 B2 | 11/2015 | Soto |
| 9,235,057 B2 | 1/2016 | Robinson et al. |
| 9,342,181 B2 | 5/2016 | Wyatt et al. |
| 9,431,621 B2 | 8/2016 | Forrest et al. |
| 9,530,381 B1 | 12/2016 | Bozarth et al. |
| 9,570,002 B2 | 2/2017 | Sakariya et al. |
| 9,614,168 B2 | 4/2017 | Zhang et al. |
| 9,633,247 B2 | 4/2017 | Pope et al. |
| 9,741,286 B2 | 8/2017 | Sakariya et al. |
| 9,762,329 B2 | 9/2017 | Motohara |
| 9,836,165 B2 | 12/2017 | Nho et al. |
| 9,870,075 B2 | 1/2018 | Han et al. |
| 9,909,862 B2 | 3/2018 | Ansari et al. |
| 9,947,901 B2 | 4/2018 | Shedletsky et al. |
| 10,073,228 B2 | 9/2018 | Polleux et al. |
| 10,079,001 B2 | 9/2018 | Hodges |
| 10,090,574 B2 | 10/2018 | Wu |
| 10,115,000 B2 | 10/2018 | Mackey et al. |
| 10,115,777 B2 | 10/2018 | Tanaka et al. |
| 10,222,475 B2 | 3/2019 | Pacala |
| 10,274,784 B2 | 4/2019 | Shimizu |
| 10,290,266 B2 | 5/2019 | Kurokawa |
| 10,331,939 B2 | 6/2019 | He et al. |
| 10,345,905 B2 | 7/2019 | McClure et al. |
| 10,410,036 B2 | 9/2019 | He et al. |
| 10,410,037 B2 | 9/2019 | He et al. |
| 10,410,039 B2 | 9/2019 | Ling et al. |
| 10,453,381 B2 | 10/2019 | Kurokawa |
| 10,474,286 B2 | 11/2019 | Bae et al. |
| 10,526,757 B2 | 1/2020 | Lee et al. |
| 10,545,616 B2 | 1/2020 | Wang et al. |
| 10,551,662 B2 | 2/2020 | Kimura et al. |
| 10,565,734 B2 | 2/2020 | Bevensee et al. |
| 10,614,279 B2 | 4/2020 | Kim et al. |
| 10,629,664 B2 | 4/2020 | Lin et al. |
| 10,637,008 B2 | 4/2020 | Harada et al. |
| 10,664,676 B2 | 5/2020 | Mackey et al. |
| 10,664,680 B2 | 5/2020 | Xu et al. |
| 10,670,790 B2 | 6/2020 | Braithwaite |
| 10,713,458 B2 | 7/2020 | Bhat et al. |
| 10,727,285 B2 | 7/2020 | Chung et al. |
| 10,747,981 B2 | 8/2020 | Jung et al. |
| 10,748,476 B2 | 8/2020 | Zhao et al. |
| 10,809,853 B2 | 10/2020 | Klenkler et al. |
| 10,838,556 B2 | 11/2020 | Yeke Yazdandoost et al. |
| 10,840,320 B2 | 11/2020 | Yazdandoost et al. |
| 10,872,222 B2 | 12/2020 | Gao et al. |
| 10,903,901 B2 | 1/2021 | Mitchell |
| 10,950,592 B2 | 3/2021 | Ding et al. |
| 10,976,416 B2 | 4/2021 | Park et al. |
| 10,978,523 B2 | 4/2021 | Park et al. |
| 10,989,846 B2 | 4/2021 | Hitomi et al. |
| 11,041,713 B2 | 6/2021 | Han et al. |
| 11,067,884 B2 | 7/2021 | Chen et al. |
| 11,158,258 B2 | 10/2021 | Cha et al. |
| 11,192,339 B2 | 12/2021 | Kim |
| 11,233,100 B2 | 1/2022 | Feng et al. |
| 11,394,014 B2 | 7/2022 | Kubota et al. |
| 11,469,573 B2 | 10/2022 | Lyon et al. |
| 11,527,582 B1 | 12/2022 | Ran et al. |
| 11,543,919 B2 | 1/2023 | Han et al. |
| 2003/0148391 A1 | 8/2003 | Salafsky |
| 2004/0067324 A1 | 4/2004 | Lazarev et al. |
| 2004/0209116 A1 | 10/2004 | Ren et al. |
| 2005/0094931 A1 | 5/2005 | Yokoyama et al. |
| 2011/0176086 A1 | 7/2011 | Katoh et al. |
| 2012/0113357 A1 | 5/2012 | Cheng et al. |
| 2013/0113733 A1 | 5/2013 | Lim et al. |
| 2014/0044392 A1* | 2/2014 | Fattal ................. G02B 6/12002 385/37 |
| 2015/0309385 A1 | 10/2015 | Shu et al. |
| 2016/0299337 A1* | 10/2016 | Arbabi ................. G02B 5/0294 |
| 2016/0353039 A1* | 12/2016 | Rephaeli ................. B82Y 20/00 |
| 2017/0242506 A1 | 8/2017 | Patel et al. |
| 2018/0032778 A1 | 2/2018 | Lang |
| 2018/0102491 A1 | 4/2018 | Hou et al. |
| 2018/0323243 A1 | 11/2018 | Wang |
| 2019/0130155 A1 | 5/2019 | Park |
| 2019/0154877 A1* | 5/2019 | Capasso ................. G02B 1/002 |
| 2019/0293849 A1 | 9/2019 | Du et al. |
| 2020/0051499 A1 | 2/2020 | Chung et al. |
| 2020/0174163 A1 | 6/2020 | Han et al. |
| 2020/0241138 A1 | 7/2020 | Allen et al. |
| 2020/0265206 A1 | 8/2020 | Chung et al. |
| 2020/0293741 A1 | 9/2020 | Du |
| 2020/0342194 A1 | 10/2020 | Bhat et al. |
| 2021/0005669 A1 | 1/2021 | Kamada et al. |
| 2021/0014429 A1 | 1/2021 | Alasirnio et al. |
| 2021/0050385 A1 | 2/2021 | Chuang et al. |
| 2021/0064159 A1 | 3/2021 | Yeke Yazdandoost et al. |
| 2021/0089741 A1 | 3/2021 | Yeh et al. |
| 2021/0091342 A1 | 3/2021 | Chen et al. |
| 2021/0103075 A1* | 4/2021 | Park ..................... G02B 5/1814 |
| 2021/0149081 A1* | 5/2021 | Groever ................ G02B 5/1842 |
| 2021/0255668 A1 | 8/2021 | Xiang et al. |
| 2021/0287602 A1 | 9/2021 | Chen et al. |
| 2021/0337140 A1* | 10/2021 | Siddique ................. G02B 1/002 |
| 2021/0396935 A1 | 12/2021 | Chen et al. |
| 2022/0035200 A1 | 2/2022 | Chen et al. |
| 2022/0158141 A1 | 5/2022 | Yuki et al. |
| 2022/0293682 A1 | 9/2022 | Einzinger et al. |
| 2023/0034270 A1 | 2/2023 | Medower et al. |
| 2023/0111407 A1 | 4/2023 | Ran et al. |

FOREIGN PATENT DOCUMENTS

| | | |
|---|---|---|
| CN | 107180853 | 9/2017 |
| CN | 107271404 | 10/2017 |
| CN | 107330426 | 11/2017 |
| CN | 107515435 | 12/2017 |
| CN | 108292361 | 7/2018 |
| CN | 108885693 | 11/2018 |
| CN | 109074475 | 12/2018 |
| CN | 109791325 | 5/2019 |
| CN | 109983471 | 7/2019 |

(56) References Cited

FOREIGN PATENT DOCUMENTS

| | | |
|---|---|---|
| CN | 110488315 | 11/2019 |
| CN | 112505808 | 3/2021 |
| DE | 202004002512 | 3/2005 |
| EP | 2463927 | 8/2013 |
| EP | 2853995 | 4/2015 |
| EP | 3171254 | 5/2017 |
| EP | 3404484 | 11/2018 |
| EP | 3438880 | 2/2019 |
| EP | 3576154 | 12/2019 |
| JP | H0642898 | 2/1994 |
| JP | 1997152840 | 6/1997 |
| JP | 2001021992 | 1/2001 |
| JP | 2010231937 | 10/2010 |
| JP | 2014089270 | 5/2014 |
| JP | 2014207446 | 10/2014 |
| JP | 2015045708 | 3/2015 |
| JP | 2016503516 | 2/2016 |
| JP | 6127447 | 5/2017 |
| JP | 2018537804 | 12/2018 |
| KR | 200312616 | 5/2003 |
| KR | 20050022260 | 3/2005 |
| KR | 20150035380 | 4/2015 |
| KR | 20180038788 | 4/2018 |
| KR | 20190013089 | 2/2019 |
| WO | WO 10/029542 | 3/2010 |
| WO | WO 17/204777 | 11/2017 |
| WO | WO 18/093798 | 5/2018 |
| WO | WO 18/186580 | 10/2018 |
| WO | WO 18/210317 | 11/2018 |

OTHER PUBLICATIONS

Garcia de Arquer et al., "Solution-processed semiconductors for next-generation photodetectors," *Nature Reviews—Materials*, 2017, vol. 2, No. 16100, pp. 1-16.

Byrnes et al., "Designing large, high-efficiency, high-numerical-aperture, transmissive meta-lenses for visible light," Optics Express, vol. 24, No. 5, Mar. 7, 2016, 15 pages.

\* cited by examiner

BEAM DEFLECTOR METASURFACE

FIELD

This disclosure relates generally to an optical device for improving stray light control and focal efficiency at non-normal angles. More particularly, embodiments herein relate to an optical device with radially arranged beam deflectors used for non-imaging applications.

BACKGROUND

Generally, optical systems are used in various devices from mobile electronic devices to display technologies. Recently, there has been a trend toward reducing the form factor of some electronic devices by making them thinner and/or smaller. This poses a challenge for any electronic device that uses classical optics such as lenses and mirrors, which tend to be bulky optical elements. Although thinner optics have been developed as an alternative to bulky classical optics, some undesirable issues exist such as resulting hot spots. Additionally, the performance of these alternative optics degrade at non-normal angles of incidence, thus making an optical component with high efficiency at non-normal angles of incidence and a small form factor desirable.

SUMMARY

Embodiments of the systems, devices, methods, and apparatuses described in the present disclosure are directed to an optical element with highly efficient performance for high numerical aperture applications and non-normal angles of incidence. Also described are systems, devices, methods, and apparatuses directed to increased beam steering capabilities using beam deflector metasurfaces. In some examples, the optical element may include beam deflectors arranged in a radial coordinate system. The beam deflectors may be radially arranged insofar as all of the beam deflectors may have the same pillar arrangement and may be repeated in a radial pattern. The arrangement of the beam deflectors in the radial pattern may depend at least in part on a desired or predetermined output angle. Put another way, the light passing through the beam deflector metasurface may be steered at predetermined output angles and the corresponding beam deflector arrangement controls the direction in which the light is steered. The optical element may have concentric zones so that the first set of beam deflectors that are the same may be used in a first concentric zone, and a second set of beam deflectors that are the same to one another, but different than the first set of beam deflectors, may be used in a second concentric zone, where the concentric zones may be similar to concentric circles. Although two concentric zones may be discussed, any number of concentric zones may be used. Additionally, the optical element may be divided into angular zones where one or more of the angular zones may have a different set of beam deflectors than other angular zones. Using angular zones may be desirable for use in addressing atypical input irradiance patterns, achieving complex far field patterns, achieving uniform far field patterns, any combination thereof and so forth.

In some examples, the present disclosure describes a beam deflector metasurface. The beam deflector metasurface may include a substrate, a first set of beam deflectors arranged on the substrate in a first concentric zone, and a second set of beam deflectors arranged on the substrate in a second concentric zone. The first set of beam deflectors may direct light passing through the beam deflector metasurface at a first angle, the second set of beam deflectors may direct light passing through the beam deflector metasurface at a second angle, the second concentric zone may be smaller in radius than the first concentric zone, and the first and second concentric zones may be arranged in concentric rings In some examples, the present disclosure describes a beam deflector metasurface. The beam deflector metasurface may include a first concentric zone, where the first concentric zone includes a first set of first beam deflectors arranged in a repeating pattern in the first concentric zone. The beam deflector metasurface may include a second concentric zone adjacent to the first concentric zone, where the second concentric zone may include a second set of second beam deflectors arranged in a repeating pattern in the second concentric zone. The first concentric zone may direct light passing through the beam deflector metasurface at a first angle via a first set of pillars and the second concentric zone may direct light passing through the beam deflector metasurface at a second angle via a second set of pillars, where the second angle is different than the first angle.

In some examples, the present disclosure describes a method for directing light. The method may include receiving the light at a beam deflector metasurface with an inner concentric zone and an outer concentric zone, directing the light at a first angle from a first zone using a first set of beam deflectors arranged in a repeating pattern, and directing the light at a second angle from a second zone using a second set of beam deflectors arranged in a repeating pattern. In some embodiments, the first set of beam deflectors include a first set of pillars and each set of pillars in the first set of pillars are positioned in a first arrangement, and the second set of beam deflectors comprise a second set of pillars and each set of pillars in the second set of pillars are positioned in a second arrangement.

In addition to the example aspects and embodiments described above, further aspects and embodiments will become apparent by reference to the drawings and by study of the following description.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

It should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

As used herein, the term "abutting" means that two elements share a common boundary or otherwise contact one another, while the term "adjacent" means that two elements are near one another and may (or may not) contact one another. Thus, elements that are abutting are also adjacent, although the reverse is not necessarily true. Two elements that are "coupled to" one another may be permanently or removably physically coupled to one another and/or operationally or functionally coupled to one another. Additionally, two elements that are "optically coupled" to one another may allow light to pass from one element to the other element.

As used throughout this specification, a reference number without an alpha character following the reference number can refer to one or more of the corresponding references, the group of all references, or some of the references. For example, "305" can refer to one or more of the beam deflectors 305 (e.g., beam deflector 305a, beam deflector 305b, etc.), can refer to all of the beam deflectors 305, or can refer to some of the beam deflectors 305 (e.g., beam deflector 305a) depending on the context in which it is used.

In the following description of examples, reference is made to the accompanying drawings in which it is shown by way of illustration specific examples that can be practiced. It is to be understood that other examples can be used and structural changes can be made without departing from the scope of the various examples.

Conventional metalenses may include nanostructures on a substrate and the phase of the exiting light may depend largely on the overall response of the nanostructures or "pillars" on the substrate to light. The pillars on a conventional metalens may be arranged over the surface of the substrate in a pattern, so that the overall metalens structure may direct light according to the aggregate response of the pillars. The term "pillar" may be used herein and refers to the nanostructures on a substrate. For some optical systems, conventional metalenses are typically designed for imaging applications where the light is directed by the conventional metalenses at a normal incidence relative to the conventional metalens substrate and used for small numerical aperture lens and short lens diameter applications. Because the pillars are arranged in the aggregate over the substrate to achieve a phase function for directing light at normal incidences, performance may degrade for non-normal angles of incidence and at high numerical apertures and large areas.

Disclosed herein is a beam deflector metasurface for directing light. The beam deflector metasurface may include numerous sets of beam deflectors positioned in a repeating arrangement, such as a lattice. Additionally, each beam deflector may include multiple pillars (e.g., 4 pillars, 6 pillars, 8 pillars, 13 pillars, or any other appropriate number). The pillars included in each beam deflector may vary in width, shape, height, have variable spacing, any combination thereof, and so forth within the structure of the beam deflector. In some embodiments, the lattice may be circular and the lattice shape may be based at least in part on a predetermined phase function. The phase function may give a predetermined or desired angular distribution of light intensity scattered by the beam deflectors. In some embodiments, the distribution of the light intensity may be a uniform distribution, a partially uniform distribution, or a non-uniform distribution. The beam deflector metasurface may function as a spatial transfer layer between the input and output angles of incidence of light.

Generally metalenses may be flatter or planar and ultra-thin and offer advantages over classical optics. Metalenses may use the phase change that can be induced locally on a light wave by a small nano-sized feature such as the pillars or nanostructures discussed herein. These nanostructures or pillars may induce a phase change to light that passes through the metalens and the induced phase change may depend at least in part on the size, geometry, and arrangement of the pillars. Depending on the arrangement of the pillars or the distribution of the pillars on the substrate of the metasurface, the wavefront of an incoming light-wave can be shaped to almost any desired form. In this way, the light propagating through and away from the metasurface can be accurately controlled.

The beam deflectors include multiple sets of pillars that may be the same or different sizes and heights. In an embodiment, the beam deflectors are arranged in a radial coordinate system. The beam deflectors may be radially arranged insofar as beam deflectors that all have the same pillar arrangement may be repeated in an overall radial and concentric pattern. In some embodiments, the beam deflectors may be arranged in a repeating pattern that may not be radial and/or concentric. The term "beam deflector structure" is used herein to refer to a beam deflector with a specific pillar arrangement. That is, the pillars within the beam deflector structure may all have a specific spacing, width, shape, height, and the same beam deflector structure indicates that each of the beam deflector structures have that particular pillar arrangement. The arrangement of the beam deflectors (e.g., the radial and/or concentric pattern) changes a phase function (e.g., output angle) of light passing through the beam deflector metasurface. Put another way, the light passing through the beam deflector metasurface may be steered at predetermined output angles that depend on a corresponding beam deflector structure and arrangement through which the light passes.

The beam deflector metasurface may have one or more concentric rings within a concentric zone. In some embodiments, the one or more concentric rings within one concentric zone may have all the same beam deflector structure. That is, all the beam deflector structures (e.g., pillar arrangements of the beam deflector) may all be the same in a concentric ring, and all the beam deflector structures may be the same in the concentric zone. One or more concentric rings form a concentric zone. The beam deflectors may be radially arranged from the inner diameter to the outer diameter of the beam deflector metasurface and within a concentric zone. Put another way, the last pillar of a first beam deflector may be radially positioned and align with the first pillar of the second beam deflector, where the first beam deflector is closer to the center of the beam deflector metasurface than the second beam deflector. Generally, the first and last pillars of each beam deflector in a concentric ring are radially aligned with the first and last pillars of each adjacent first and last pillars of the adjacent concentric rings, thus they may "radiate" from the inner diameter to the outer diameter within the concentric zone. Further, the beam deflectors may have the same pillar arrangements and be radially arranged within a concentric zone so that when the beam deflector structure radially changes, so does the concentric zone. By way of explanation, in some embodiments, as the beam deflectors radiate and are aligned from the inner diameter to the outer diameter of the beam deflector metasurface, when the beam deflector structures are the same, they are in the same concentric zone, when the beam deflector structure changes to a different structure, that is a different concentric zone.

In some embodiments, radial zones so that a first set of identical first beam deflectors may be used in a first concentric zone and a second set of identical second beam deflectors to each other, but the first and second beam deflectors of the first and second sets may be different from one another. Additionally, the second concentric zones may be concentric about the first concentric zone and the first and second sets of beam deflectors have different physical properties. Further, the first concentric zone and the second concentric zone may be adjacent to one another. In other examples, the first concentric zone and the second concentric zone may be abutted to one another. Although first and second concentric zones may be described herein, any number of concentric zones may be used.

A beam deflector may include pillars that function similar to diffractive gratings and that cross-couple with one another to direct the light. The pillars may be the same or different widths, may be the same or different heights, may have a pitch between the pillars that is the same or varies, and may be circular, square, rectangular, or any other appropriate shape. In some embodiments, a beam deflector metasurface may include multiple concentric zones. Each concentric zone may include one or more concentric rings and the concentric rings include a repeating lattice of beam deflectors. That is, a first beam deflector structure may be radially arranged in each of the concentric rings. There may be ten, fifteen, twenty, fewer, or more concentric rings within a concentric zone and the concentric rings may include a first type of beam deflector structure. Different concentric zones may include different beam deflector structures and may include a different or the same number of concentric rings as other concentric zones. Further, the concentric zones may be the same or different widths.

Additionally, the beam deflector metasurface may be divided into angular zones (e.g., quadrants, octants, and so forth) where one or more of the angular zones may have a different set of beam deflectors than other angular zones. Put another way, one quadrant of a circular beam deflector metasurface may have a different phase function than the other A beam deflector metasurface with such angular zones may be useful in addressing atypical input irradiance patterns, achieving complex far field patterns, achieving uniform far field patterns, any combination thereof, and so forth.

The beam deflector metasurface may be a large area, high numerical aperture metasurface optic that may be configured to direct light towards a target with high efficiency across non-normal angles of incidence. In an example, the target phase function that may be used to design the beam deflectors may have a zero to two pi phase shift over a distance that may be mapped to a range of target detection angles. The beam deflector metasurface may be capable of achieving the zero to two pi phase shift over the same distance.

These and other embodiments are discussed below with reference to FIGS. 1A-5B. However, those skilled in the art will readily appreciate that the detailed description given herein with respect to these Figures is for explanatory purposes only and should not be construed as limiting.

Figure 1A:
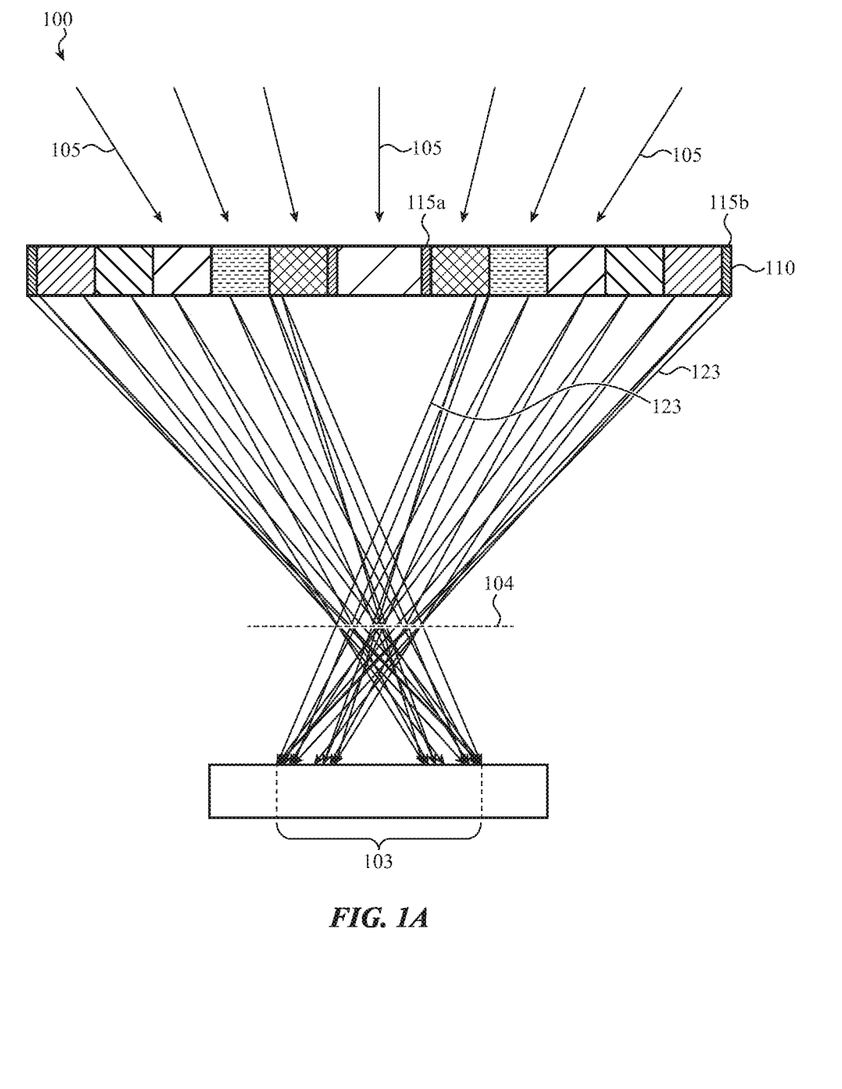
FIG. 1A illustrates an example cross section of a beam deflector metasurface.

FIG. 1A illustrates an example a cross section of a beam deflector metasurface 110. The optical system 100 may receive light 105 by the beam deflector metasurface 110 and direct the received light to a target area 103. The beam deflector metasurface 110 may include a unit cell, where the unit cell may be referred to herein as a "beam deflector" (the individual beam deflectors not specifically illustrated in FIG. 1A). It may be understood that the term "beam deflector metasurface" includes multiple beam deflectors arranged in concentric zones as well as the substrate upon which the beam deflectors are arranged. The beam deflectors may be arranged in a repeating pattern in a radial arrangement. The concentric zones are illustrated as a cross section in FIG. 1A. The properties and features of the beam deflectors and beam deflector metasurfaces will be described herein with reference to FIGS. 1A-5B.

In the optical system of FIG. 1A, the beam deflector metasurface 110 may direct the light 123 to the target area 103. As shown, the target area 103 may not be the narrowest area or focal plane of the light. Put another way, the target area 103 may have a larger beam diameter than the beam diameter at the focal plane 104, which is the narrowest intersection of the light after passing through the beam deflector metasurface 110. In the example of FIG. 1A, the beam deflector metasurface 110 functions as a non-focusing optic that may have improved efficiency at the far edges or the inside concentric zone 115a and the outside concentric zone 115b of the beam deflector metasurface 110 over using a conventional optical element. As shown by the light passing through the outside concentric zone 115b of the beam deflector metasurface 110, the angle at which the light may be directed may be a higher angle than the light that passes through the inside concentric zone 115a. Because of the concentric zone arrangement of the beam deflector metasurface 110, light may be directed differently in each of the concentric zones 115.

Additionally, the use of a beam deflector metasurface 110 may achieve higher efficiency with applications that use lenses with a large numerical aperture and long lens diameter (e.g., greater than approximately one mm diameter). Additionally, the beam deflector metasurface 110 may achieve improved performance over conventional optics and conventional metalenses for applications that employ non-normal angles of incidence.

Figure 1B:
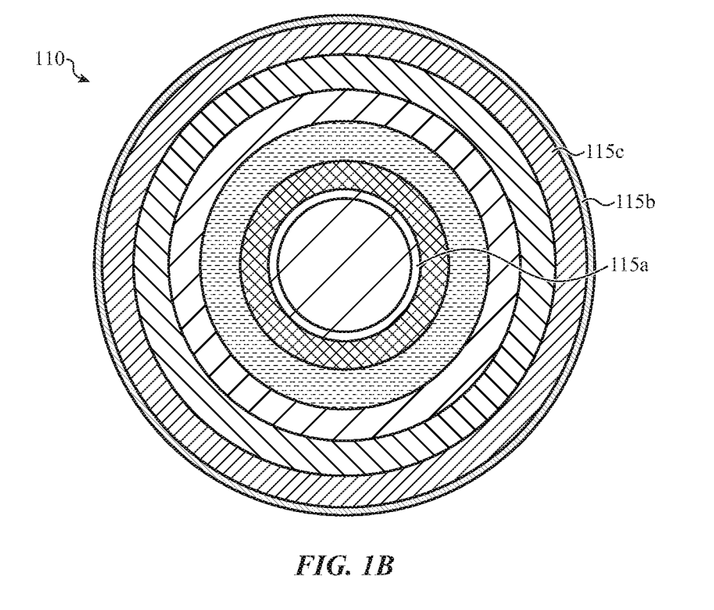
FIG. 1B illustrates an example top view of a beam deflector metasurface.

FIG. 1B illustrates an example top view of a beam deflector metasurface 110. The beam deflector metasurface includes concentric zones 115. The inner concentric zone 115a and the outer concentric zone 115b may direct light at different angles according to a predetermined or desired phase function. In some embodiments, the phase function may repeat more often with large lens diameters and also may be periodic. The phase function may become closer and closer to periodic as the diameter of the lens increases. The beam deflector metasurface 110 may have a lattice structure that matches the periodicity of the phase function, thus becoming a higher efficiency lens. The beam deflector metasurface 110 exhibits symmetry both radially and angularly. Put another way, the radial function is the same regardless of the angular position sampled on the circular lattice. In some embodiments, the circular lattice of the beam deflector metasurface may be radially and angularly symmetric.

As shown, the beam deflector metasurface 110 includes multiple concentric zones 115, each of which may be capable of directing light at a different angle. Each of the concentric zones may be adjacent to one another and in some embodiments may be abutted to one another. Although the middle concentric zones such as concentric zone 115c are illustrated as the same width, they may be the same width or varying widths depending on the predetermined phase function. In an example, the outer concentric zone 115b may direct light at a greater angle than the inner concentric zone 115a. Although the circular lattice is illustrated, any shape lattice may be used such as square, hexagonal, octagonal, and so forth depending on the predetermined or desired phase function. In an example, if a hexagonal lattice is employed, the similar beam deflectors may be positioned in each of the hexagonal zones. The increased symmetry of the repeated beam deflector structures within the lattice may allow modeling of a large area metasurface (e.g., greater than approximately 500 microns).

Each of the concentric zones 115 may include multiple radially concentric layers of beam deflectors (not illustrated in FIG. 1B). Each beam deflector within a concentric ring may be identical to each other as well as the beam deflectors in each of the concentric rings that together form a concentric zone 115. Similar to the concentric zones, as the concentric rings expand out in the radial pattern, the concentric rings may be adjacent to each other and may also be abutted to each other. As illustrated in FIG. 1B, the beam deflector metasurface 110 may have concentric zones 115 that may be configured to direct light at any desired angle. Further, the concentric zones 115 may be designed so that the light passing through the concentric zone may be outputted to match the predetermined phase function of the target area. Each of the concentric zones 115 of the beam deflector metasurface 110 may have different beam deflectors. That is, the beam deflectors in a first concentric zone 115 may have a different number of pillars than the beam deflectors in a second concentric zone 115. In another embodiment, the beam deflectors in a first concentric zone 115 may have the same number of pillars, but the size differential of the pillars may be different than the size differential of the pillars in a second concentric zone 115. Although the embodiment of FIG. 1B is circular, any other shape may be used, such as an oval or racetrack shape, an asymmetric shape, or a configuration of beam deflectors as described with reference to FIG. 1C and so forth.

As shown in FIG. 1B, the concentric zone 115b may include a first set of beam deflectors arranged in a repeating pattern. The concentric zone 115c may be adjacent to concentric zone 115b and may include a second set of beam deflectors arranged in a repeating pattern. In some embodiments the repeating pattern of the first set of beam deflectors may be the same as the repeating pattern of the second set of beam deflectors, while in other embodiments, the patterns in the first and second set of beam deflectors may not be the same as each other.

Figure 1C:
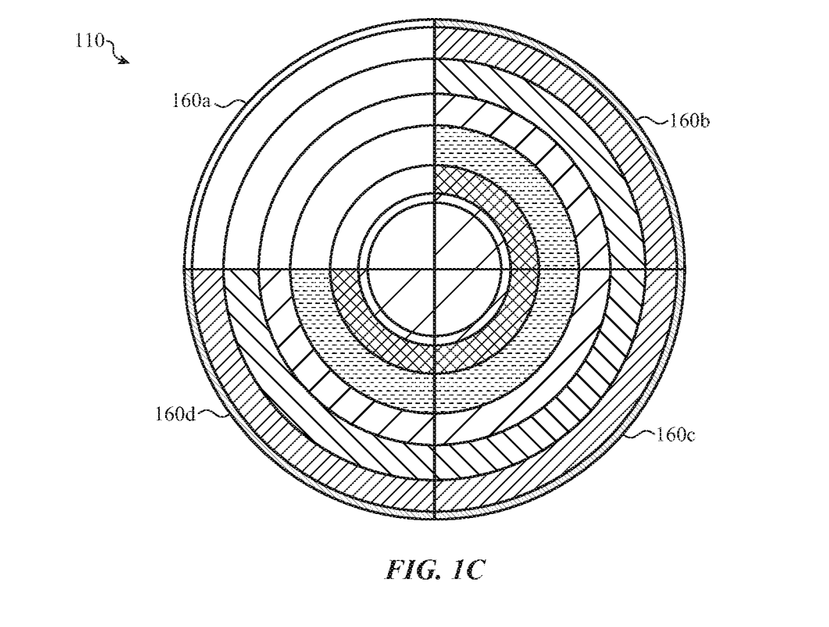
FIG. 1C illustrates an example top view of a non-symmetric beam deflector metasurface.

FIG. 1C illustrates an example top view of a non-symmetric beam deflector metasurface 110. Comparing the beam deflector metasurface 110 of FIG. 1C with that of FIG. 1B, the top left quadrant 160a may achieve a different phase function than the other quadrants 160b, 160c, 160d. That is, the top left quadrant 160a may direct light to different angles than the other quadrants 160b, 160c, 160d due to the positioning and size of the pillars in the beam deflectors.

In this example, the top left quadrant 160a may have different beam deflector structures than the beam deflectors of the other quadrants 160b, 160c, 160d. The modularity of the beam deflector metasurface 110 is advantageous as it may be specifically designed to address focal hot spots and beam detector over shoot and under shoot. In designing to reduce a focal hot spot, the beam deflector metasurface 110 may spread out the light in a particular area, direct light to a particular area and away from another area, and so forth. In other embodiments, each of the quadrants may differ from one another, two of the quadrants may be different from each other and from all of the other quadrants, and so forth.

Figure 2:
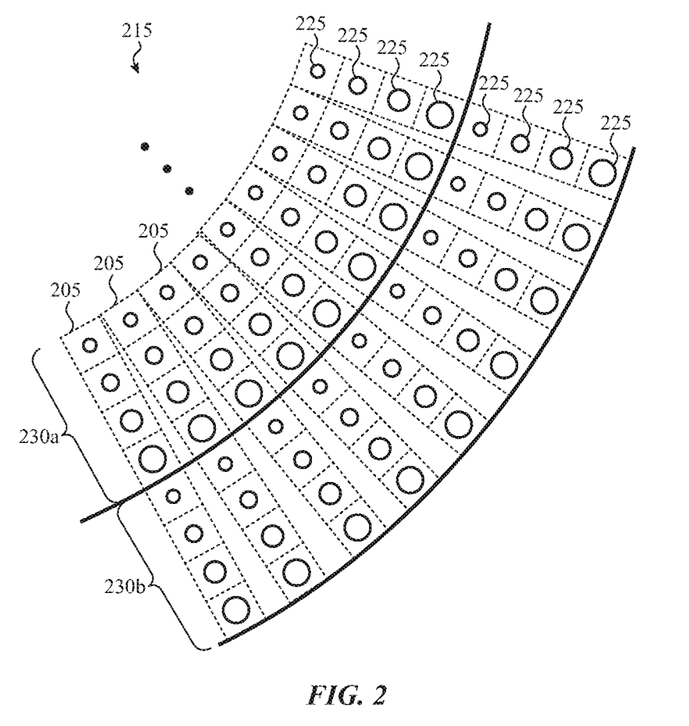
FIG. 2 illustrates an example top view of a partial concentric zone of a beam deflector metasurface.

FIG. 2 illustrates an example of a partial concentric zone 215 of a beam deflector metasurface. The partial concentric zone 215 includes multiple repeating beam deflectors 205. As illustrated, the beam deflectors have four pillars 225, but may include any number of pillars as appropriate for the desired phase function. Additionally, although the pillars 225 may be spaced apart by a similar pitch, in other embodiments, the pitch may vary. The pillars 225 may function as resonators and the cross-coupling between the pillars 225 may control the direction of the light passing through the beam deflector metasurface.

The partial concentric zone 215 includes two concentric rings 230a, 230b of beam deflectors radially arranged. That is, the complete concentric zone (complete concentric zone is not illustrated in FIG. 2) includes multiple concentric rings 230 that form a zone so that the lattice of the complete beam deflector metasurface may be an r-theta type lattice. The beam deflectors may each have a first end near the smaller pillar and a second end near the larger pillar. As shown, the beam deflectors may be placed end to end, with a first end of one beam deflector near to, abutting, or adjacent to the second end of another beam deflector. The beam deflectors in each concentric ring 230 of the concentric zone 215 may include the same pillar arrangement. Further, each concentric zone 215 may include beam deflectors with different pillar arrangements in each of the concentric zone 215 depending on the phase function.

Although only two concentric rings of partial concentric zones 215 are illustrated in FIG. 2, there may be many more layers of beam deflectors that are in a concentric zone 215. The arrangement of the beam deflectors may be similar to a lattice structure. The lattice structure may be an r-theta lattice in that the beam deflector metasurface includes repeating structures in a radial pattern (e.g., each ring or concentric zone may include the same repeating beam deflectors) and also angularly in that a first quadrant (e.g., similar to the shape of a slice of pie) may include the same repeating structures as a second quadrant of the beam deflector metasurface. In some embodiments, an r-theta lattice (e.g., a circular lattice) of the beam deflector metasurface may be radially and angularly symmetric. The use of the r-theta lattice may resolve a general mismatch between the phase function and other lattice shapes such as square or hexagonal. With that said, the lattice structure depends largely on the predetermined phase function and may be any appropriate lattice such as square, hexagonal, octagonal, and so forth. In an example, the phase function may repeat periodically with large lens diameters so each of the concentric zones 215 may direct light to a specific angle. In other words, the lattice and the phase function may be "matched" in that the repeating phase function may be produced with the repeating lattice structure of each of the concentric zones of beam deflectors.

The pillars 225 of each beam deflector are depicted as round, but may be a different shape. The shape, pitch, width, height, any combination thereof, and so forth may affect the cross coupling between the pillars, thus affecting the angle at which the light passing through may be directed.

Further, the beam deflectors may each be rectangular because the beam deflector includes a one by four cell of pillars 225. The beam deflectors may be other shapes that maintain periodicity when arranged in an r-theta lattice. As illustrated, the rectangular shape of the beam deflectors may result in a "fanning out" as the beam deflectors are arranged in larger concentric rings. Put another way, space between the beam deflectors (e.g., pitch error) may be introduced the further out radially the beam deflectors are positioned. In an example, the design may maintain a periodic arrangement that reduces this pitch error until it reaches a critical point and then the pitch may be reset.

Figure 3:
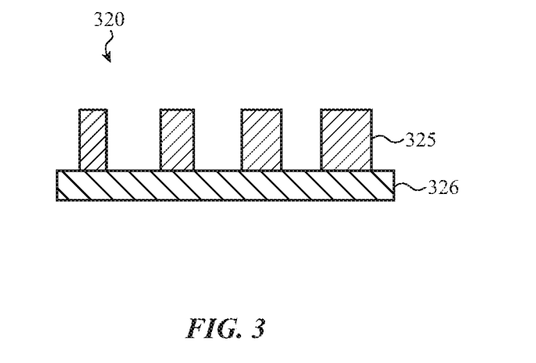
FIG. 3 illustrates an example beam deflector with pillars.

FIG. 3 illustrates an example of a side view of a beam deflector 320 with pillars 325. The beam deflector 320 may be a unit cell that is repeatedly arranged in the concentric zones of the beam deflector metasurface as described with reference to FIG. 1A. As shown in the embodiment of FIG. 3, the pillars 325 may be different widths and the same height. It may be understood that although the pillars may be described as the "same height," and the beam deflectors may be described herein as "identical" or "the same," these elements may be as similar as may be achieved through the processing operations of fabricating the elements. That is, although the intent may be to manufacture identical or similar elements, there may be process fluctuations that introduce some variations in the elements. Although four pillars are illustrated in FIG. 3, this is for discussion purposes only, as any appropriate number of pillars may be used in the beam deflectors.

The beam deflector 320 is a unit cell that includes one or more pillars 325 arranged on a substrate 326. The pillars 325 are arranged in a unit cell (e.g., a 1×n group of pillars), where the unit cell may be referred to herein as a "beam deflector." It may be understood that the term "beam deflector metasurface" includes multiple beam deflectors arranged in concentric zones as well as the substrate upon which the beam deflectors are arranged. This "chain" of pillars 325 of the beam deflector 320 may be arranged to target specific output angles to achieve a predetermined or desired phase function.

By employing repeated unit cell beam deflector structures, the etch loading may be easier to model and/or predict due to the repeated pattern and the zoning of the beam deflector metasurface. In other embodiments, the pillars and beam deflectors may be processed through the enabling of self-assembled metasurfaces or nano-imprints. Furthermore, the beam deflector metasurface structure may allow for backfill material (e.g., liquid crystalline monomer) that may enable dynamic behavior, such as becoming electro-optically sensitive.

Additionally, the design of the pillars and the placement of the pillars and location and design of the beam deflector structures may be based on some other factor aside from achieving a predetermined phase function, such as the zoning of other shaped or asymmetric beam deflector metasurfaces. Further, by tuning the height of the pillars, the beam deflectors may be sensitive to wavelength and designed accordingly. In some embodiments, the set of beam deflectors may include a set of pillars, where the height of the pillars may determines a wavelength sensitivity of the set of beam deflectors.

The beam deflector 320 may be repeatedly arranged in a radial pattern to direct light and achieve the predetermined phase function. The beam deflectors 320 may be also used for typical lensing functions, but may achieve a more uniform output than phase functions produced by conventional metalenses. Put another way, the beam deflectors 320 may direct light in a way that reduces hot spots commonly produced when using conventional metalenses and classical optics. Due to the use of the radially arranged beam deflectors 320, the far inner and outer concentric zones of the beam deflector metasurface may be designed to achieve high angle beam steering compared to that which is produced with known optics.

Additionally, the beam deflectors 320 may be sensitive to polarization. The light passing through the beam deflector metasurface may be polarized along the direction of the arranged pillars as opposed to the orthogonal direction and the light may be affected differently. Because of this, the beam deflectors may be positioned to pass and block different polarizations of light. In some embodiments, a set of beam deflectors may include a set of pillars that may allow light of a first polarization to pass in a first direction and attenuate light of a second polarization passing in a second direction. In this embodiment, the first direction may be orthogonal to the second direction.

Figure 4A:
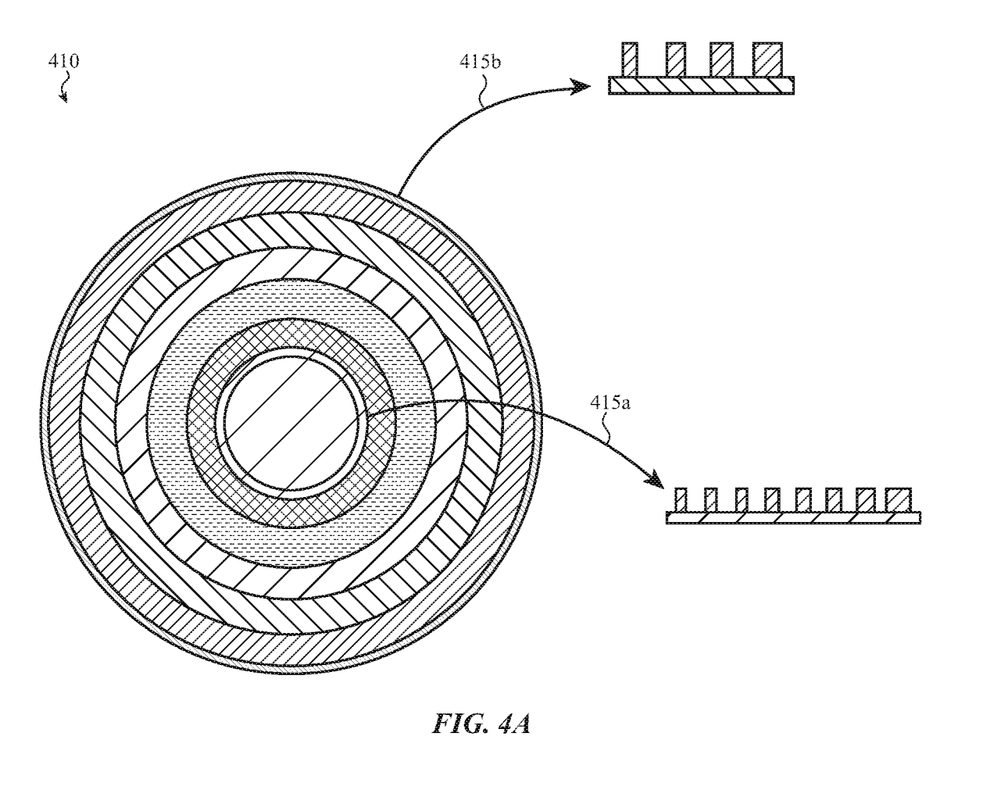
FIG. 4A illustrates a top view of an example beam deflector metasurface.

FIG. 4A illustrates a top view of an example beam deflector metasurface 410. Also shown are FIGS. 4B and 4C, which respectively illustrate a side view of a representative beam deflector in an outer concentric zone of the beam deflector metasurface of FIG. 4A, and a side view of a representative beam deflector in an inner concentric zone of the beam deflector metasurface of FIG. 4A. The inner and outer concentric zones 415a and 415b may be narrower than the other concentric zones. As shown, the beam deflector metasurface 410 may have radial and angular symmetry even though the inner and outer concentric zones 415a, 415b are narrower. The different widths of the concentric zones 415 may be designed to achieve the predetermined or desired phase function. Each of the concentric zones 415 may direct light at a different angle, or two of the concentric zones may direct light at the same angle, there may be a gradual or an abrupt angle change from concentric zone to concentric zone, and so forth. The seven concentric zones 415 shown in FIG. 4A include two different widths. The inner concentric zone 415a and the outer concentric zone 415b may be the same width as one another and the other five concentric zones 415 may be the same width as one another. In other embodiments, each of the concentric zones may be different widths from one another, three of the concentric zones may be the same width and the other concentric zones may be different widths, and so forth. Additionally, there may be fewer or more concentric zones depending on the predetermined phase function to be achieved and the size of the target area. In the embodiment of FIG. 4A, the outer concentric zone 415b may direct the light at a steeper angle than the inner concentric zone 415a. Depending on the predetermined phase function, the concentric zones 415 may direct light accordingly as will be described herein with reference to FIGS. 4B and 4C.

The non-imaging application of FIG. 4A, may receive light and direct the light to a defined range of angles of incidence. In an example, the light may be directed to a detector with an area on the order of around 100 microns. Thus, in the example of FIG. 4A, the outer concentric zone 415b may direct light at approximately 45 degrees with a short grating chain of four pillars and the inner concentric zone 415a may direct the light at approximately 20 degrees with a longer grating chain of eight pillars. Due to the cross-coupling of the pillars, the performance and efficiency of the beam deflector metasurface may improve over the entire range of angles of incidence. In other embodiments, the detector plane may be approximately 1.5 mm.

One of the desirable qualities of beam deflector metasurfaces is the optical performance that may be achieved without the penalty of thick conventional optics. Beam deflector metasurfaces are generally "flat" when compared to conventional optical elements and this "flat optic" structure may allow for multiple beneficial uses. One such use may be the integration of the beam deflector metasurface with filters (e.g., anti-reflective filters, band pass filters, angular filters, and so forth). In an embodiment, an optical stack including a beam deflector metasurface may allow increased performance with a targeted diffractive order in addition to targeting the predetermined phase function alone. Another "flat optic" benefit of a beam deflector metasurface is the avoidance of shadowing due to the uniform height of the structure across the beam deflector metasurface. Additionally, another advantageous use of a beam deflector metasurface may be the ability to pattern the beam deflector metasurface onto other active devices (e.g., light sources such as vertical cavity surface emitting lasers, detectors, and so forth) and the ability to pattern active devices onto the beam deflector metasurface (e.g., failsafe traces). It should be understood that the beam deflectors may be arranged in any type of repeating pattern, which may not be a radial and/or a concentric repeating pattern.

Figure 4B:
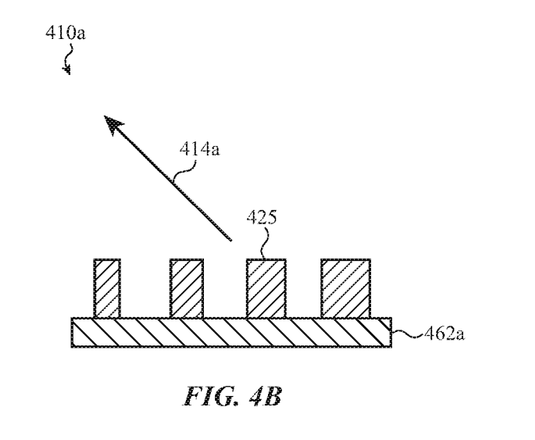
FIG. 4B illustrates a side view of a representative beam deflector in an outer concentric zone of the beam deflector metasurface of FIG. 4A.
Figure 4C:
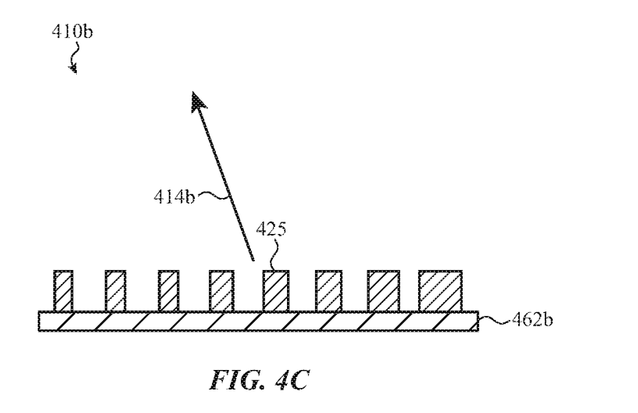
FIG. 4C illustrates a side view of a representative beam deflector in an inner concentric zone of the beam deflector metasurface of FIG. 4A.

FIG. 4B shows a beam deflector 410a of the outer concentric zone 415b of FIG. 4A and FIG. 4C shows a beam deflector 410b of the inner concentric zone 415a of FIG. 4A. The beam deflector 410a has four pillars 425 arranged on a substrate 462a, where each pillar 425 is a different size from each other. The beam deflector 410a may be positioned in a repeated, radial pattern as shown in FIG. 2. Ten, twenty, hundreds, more or less than ten, and so forth of the beam deflectors may be positioned in a repeated, radial pattern in inner concentric zones 415a. In the example of FIG. 4B, the beam deflector 410a may function as a four pillar grating that deflects light at an approximately 45 degree angle 414a. In FIG. 4C, the beam deflector 410b has eight pillars 425 arranged on a substrate 462b that function as an eight pillar grating that directs light at an approximately 20 degree angle 414b.

As previously described, the cross-coupling between the pillars or resonators may improve efficiency over a wide range of angles. By arranging these beam deflectors in a repeated radial pattern, the beam deflector metasurface may function as a high numerical aperture, large diameter lens (e.g., approximately one mm). Further, the beam deflector metasurfaces are useful for deteriorating focus, which may eliminate hot spots and spread the received light over the target area, such as a detector. Additionally, the described beam deflector metasurfaces may have improved efficiency at the edges due to the ability to direct light at a steeper angle and because of the radial design. As described herein, the beam deflectors may be arranged in a repeated radial pattern, but it is to be understood that the beam deflectors may be arranged in any type of repeating pattern, which may not be radial and/or concentric.

In other embodiments, the pillars 425 may all be different sizes, one pillar may be a different size from the other pillars, two pillars may be the same size and the other two may be different sizes, and so forth as may be dependent on the number of pillars. Similarly, the pitches may be the same or varied as with the pillars. That is, the pitch between all of the pillars may be the same, one of the pitches may be different, two of the pitches between the pillars may be different, and so forth depending on the number of pillars.

Figure 4D:
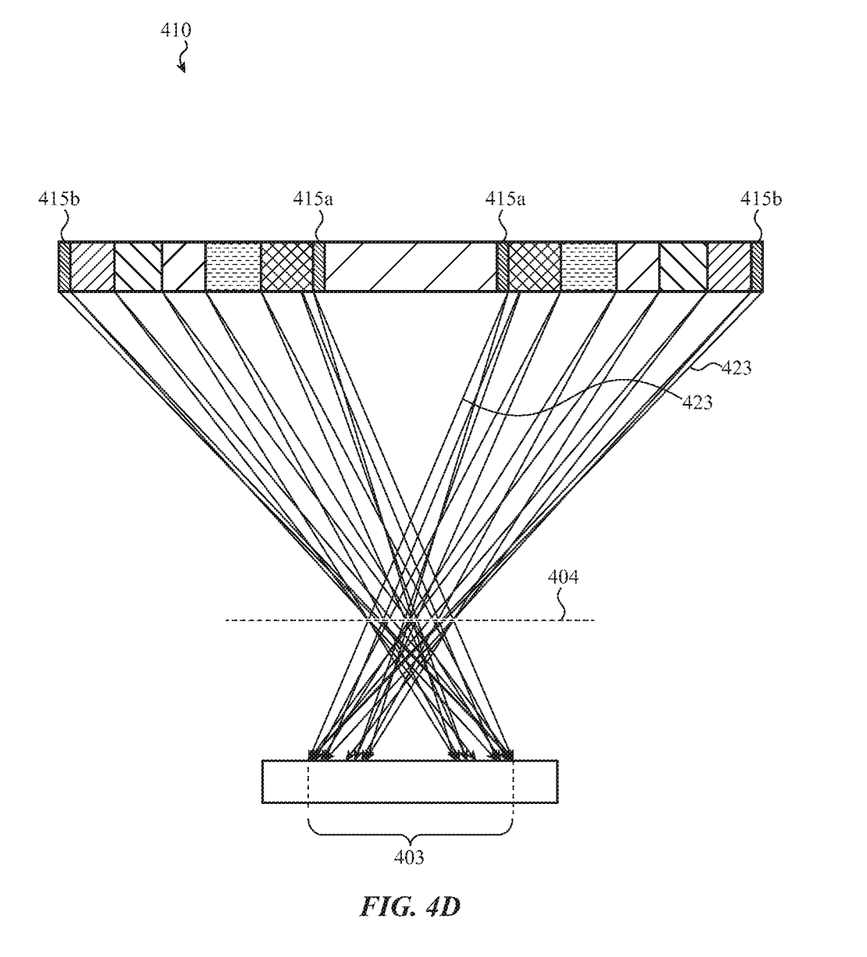
FIG. 4D illustrates a cross section of the beam deflector metasurface of FIG. 4A directing light.

FIG. 4D illustrates a cross section of the beam deflector metasurface of FIG. 4A directing light. Similar to FIG. 1A, the beam deflector metasurface may direct light 423 to a target area 403 with a width that is less than the focal plane 404 of the direct light 423. As previously described, the beam deflector metasurface 410 of FIGS. 4A-4D may be designed for a deteriorating focus or non-imaging application. Also illustrated in FIG. 4D, the outer concentric zone 415b directs light at a sharper angle than the inner concentric zone 415a. Although the light 423 passing through the beam deflector metasurface 410 is shown as distinct beams, it may be understood that this is for illustrative and discussion purposes only and that the light may pass through the entire surface of the beam deflector metasurface and light may be directed by the entire surface of the beam deflector metasurface.

Figure 5A:
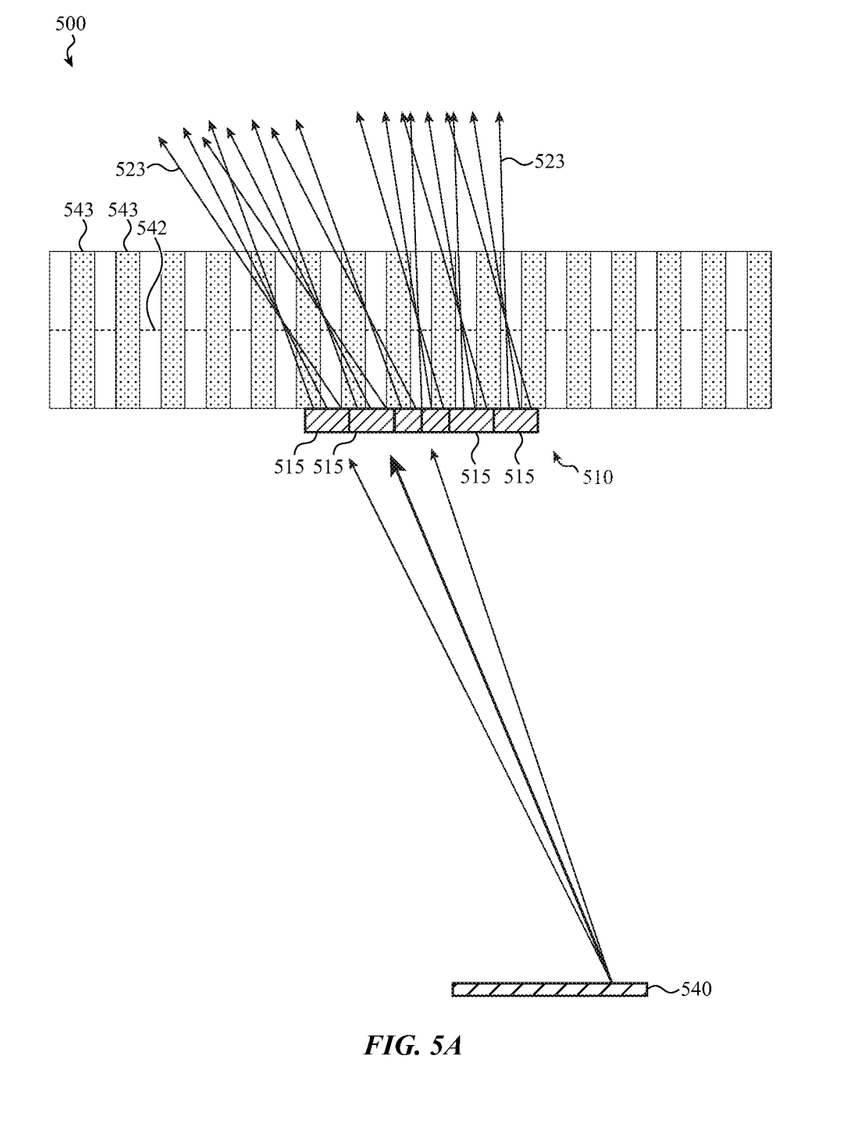
FIG. 5A illustrates a side view of an optical system with light passing through and being directed by part of a beam deflector metasurface.

FIG. 5A illustrates a side view of an optical system 500 with light passing through and being directed by a cross section of a beam deflector metasurface with zones 515. The optical system 500 may include a light source 540 that emits light toward a beam deflector metasurface 510. The beam deflector metasurface 510 includes multiple zones 515. The beam deflector metasurface 510 directs the light so that light may pass through the apertures 542 as opposed to being partially blocked by the areas 543 defining the apertures. Each of the zones may be designed with a repeating structure of beam deflectors to direct the light at the appropriate angle so that the light may pass through the apertures as will be described with reference to FIG. 5B. In some embodiments, the zones may be concentric zones as described herein.

Figure 5B:
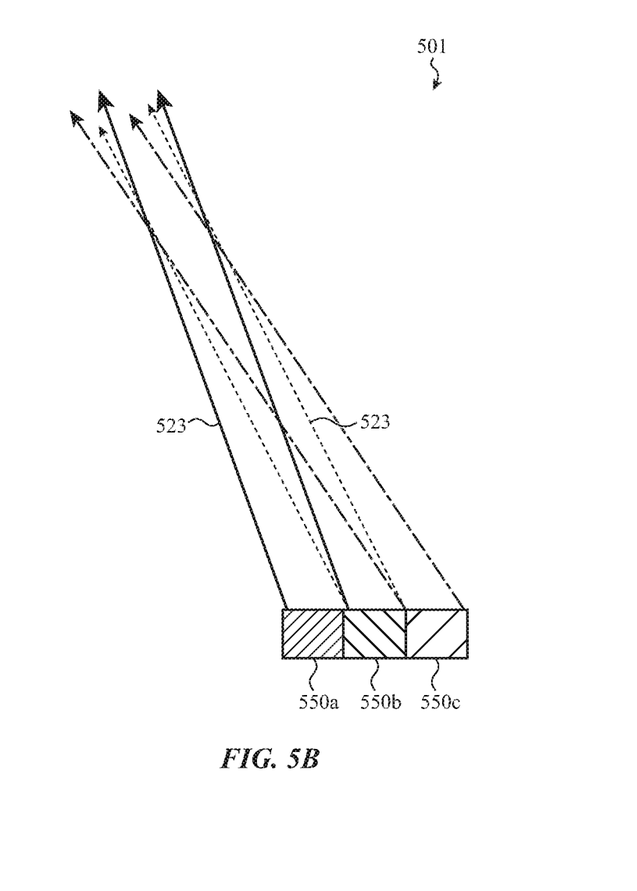
FIG. 5B illustrates a partial cross section of the beam deflector metasurface of FIG. 5A.

FIG. 5B illustrates a partial cross section 501 of the zones 515 of the beam deflector metasurface 510 of FIG. 5A. As shown in FIG. 5B, each of the zones may include three beam deflector zones. That is, a first beam deflector zone may include a first repeating beam deflector structure, a second beam deflector zone may include a second repeating beam deflector structure, and the third beam deflector zone may include a third repeating beam deflector structure. The three beam deflector zones may all be included in one zone of the beam deflector metasurface 510. Each of the beam deflector zones may include multiple rings of the repeating, radially arranged beam deflectors, where the beam deflectors may be the same within the beam deflector zone. In some embodiments, the rings of the beam deflectors may be concentric rings as described herein.

In FIG. 5B, the first beam deflector zone 550a may include multiple rings of the same first beam deflector structure. Put another way, the first beam deflector zone 550a may include a first beam deflector structure with eight pillars of varying sizes. The first beam deflector structure with eight pillars may be repeatedly, radially arranged within the beam deflector zone 550a. The second beam deflector zone 550b may include multiple rings of the same second beam deflector structure. The second beam deflector zone

550b may include a second beam deflector structure with six pillars of varying sizes, which may be repeated, radially arranged within the second beam deflector zone 550b. The third beam deflector zone 550c may include a third beam deflector structure with four pillars of varying sizes, which may be repeatedly, radially arranged within the third beam deflector zone 550c. The first, second, and third beam deflector zones 550a, 550b, 550c may be configured to direct light 523 at three different angles, where the third beam deflector zone 550c may direct light 523 at a steeper angle than the first beam deflector zone 550a. The design of the beam deflector zones may control the size of the focal spot width where the directed light may pass through the beam deflector zones 550. This design may avoid hot spots and improve far field uniformity. This beam deflector geometry may improve the directed light paths to reduce stray light and improve the flexibility of the far field beam shaping.

In the embodiment of FIG. 5B, the first beam deflector zone 550a may direct light at approximately an 18 degree angle, the second beam deflector zone 550b may direct light at approximately a 27 degree angle, and the third beam deflector zone 550c may direct light at approximately a 36 degree angle, when the light received by the zone is in the range of 30-35 degrees. Depending on the design of the beam deflector structures and the configuration of the beam deflector structures within the zones, the light may be directed at less steep or steeper angles than the example depicted in FIG. 5B.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its description in a drawing does not imply that the illustrated process is exclusive of other variations and modification thereto, does not imply that the illustrated process or any of its steps are necessary to one or more of the examples, and does not imply that the illustrated process is preferred.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the above examples should not be taken as limiting.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A beam deflector metasurface for a non-imaging application, the beam deflector metasurface comprising:
    a substrate;
    a first set of beam deflectors arranged on the substrate in a first concentric zone; and
    a second set of beam deflectors arranged on the substrate in a second concentric zone; wherein:
        the first and second concentric zones are arranged in concentric rings;
        the second concentric zone is smaller in radius than the first concentric zone;
        the first set of beam deflectors is configured to receive first light that is incident on the substrate at a first range of angles of incidence including non-normal angles of incidence, and direct the first light passing through the beam deflector metasurface toward a target;
        the second set of beam deflectors is configured to receive second light that is incident on the substrate at a second range of angles of incidence including non-normal angles of incidence, and direct the second light passing through the beam deflector metasurface toward the target; and
        the first light and the second light intersect.

2. The beam deflector metasurface of claim 1, wherein:
    the first set of beam deflectors direct light passing through the substrate at a first angle that is steeper than a second angle at which the second set of beam deflectors direct light;
    each one of the first set of beam deflectors comprises:
        a set of pillars of at least two different widths; and
        a first pillar arrangement;
    each one of the second set of beam deflectors comprises:
        a second pillar arrangement; and
    the first pillar arrangement of the first set of beam deflectors is different than the second pillar arrangement of the second set of beam deflectors.

3. The beam deflector metasurface of claim 1, wherein:
    one of the first set of beam deflectors comprises a first set of pillars having a first number of pillars;
    one of the second set of beam deflectors comprises a second set of pillars having a second number of pillars; and
    the first number of pillars is different than the second number of pillars.

4. The beam deflector metasurface of claim 1, wherein:
    the first set of beam deflectors is arranged in a repeating, radial pattern in a first concentric ring; and
    each of the first set of beam deflectors comprises pillars arranged in a same pattern.

5. The beam deflector metasurface of claim 4, wherein the first concentric zone comprises multiple concentric rings.

6. The beam deflector metasurface of claim 1, wherein:
    the first set of beam deflectors comprises a first set of pillars;
    a first pillar and a second pillar of the first set of pillars are separated by a first pitch;
    the second pillar and a third pillar of the first set of pillars are separated by a second pitch; and
    the first pitch and the second pitch are a same distance.

7. The beam deflector metasurface of claim 1, wherein:
    the first set of beam deflectors comprises a first set of pillars; and
    a height of the first set of pillars determines a wavelength sensitivity of the first set of beam deflectors.

8. The beam deflector metasurface of claim 1, wherein:
    the first set of beam deflectors comprises a first set of pillars;
    the first set of pillars allows light of a first polarization to pass in a first direction;
    the first set of pillars attenuates light of a second polarization passing in a second direction; and
    the first direction is orthogonal to the second direction.

9. A beam deflector metasurface for a non-imaging application, the beam deflector metasurface comprising:
- a first concentric zone comprising:
  - a first set of first beam deflectors, each first beam deflector of the first set of first beam deflectors comprising a respective first set of pillars, the first beam deflectors of the first set of first beam deflectors arranged in a repeating, radial pattern, and each first beam deflector of the first set of beam deflectors separated from adjacent beam deflectors of the first set of beam deflectors by a same angle;
- a second concentric zone to non-overlapping with respect to the first concentric zone, the second concentric zone comprising:
  - a second set of second beam deflectors, each second beam deflector of the second set of beam deflectors comprising a respective second set of pillars, the second beam deflectors of the second set of beam deflectors arranged in the repeating, radial pattern, wherein:
    - the first concentric zone receives light at a first non-normal angle of incidence and directs light passing through the beam deflector metasurface at a first angle via the first set of pillars; and
    - the second concentric zone receives light at a second non-normal angle of incidence and directs light passing through the beam deflector metasurface at a second angle via the second set of pillars, wherein:
      - the first angle differs from the second angle; and
      - the light directed from the first concentric zone and the light directed from the second concentric zone intersect.

10. The beam deflector metasurface of claim 9, wherein: a number of pillars in the first set of pillars is different than a number of pillars in the second set of pillars.

11. The beam deflector metasurface of claim 10, wherein: the first concentric zone comprises:
- a first concentric ring; and
- a second concentric ring adjacent to the first concentric ring.

12. The beam deflector metasurface of claim 9, wherein: a first beam deflector of the first set of first beam deflectors directs light to match a predetermined phase function; and
the beam deflector metasurface is a high numerical aperture lens.

13. The beam deflector metasurface of claim 9, wherein a circular lattice of the beam deflector metasurface is radially and angularly symmetric.

14. The beam deflector metasurface of claim 9, wherein:
the beam deflector metasurface comprises four radial quadrants;
a first quadrant of the four radial quadrants comprises a third set of third beam deflectors; and
the third set of third beam deflectors directs light at a different angle than the first set of the first beam deflectors and second set of the second beam deflectors.

15. A method for directing light, comprising:
receiving the light at a beam deflector metasurface with an inner concentric zone and an outer concentric zone, the light received at a range of angles of incidence including non-normal angles of incidence, the beam deflector metasurface configured for a non-imaging application;
directing the light at a first angle from a first zone using a first set of beam deflectors arranged in a repeating, radial pattern, the light directed toward a target;
directing the light at a second angle from a second zone using a second set of beam deflectors arranged in a repeating, radial pattern, the light directed toward the target, wherein:
the first set of beam deflectors comprises a first set of pillars;
each set of pillars in the first set of pillars is positioned in an arrangement;
the second set of beam deflectors comprises a second set of pillars; and
each set of pillars in the second set of pillars is positioned in the arrangement; and
light passing through the first set of beam deflectors and the light passing through the second set of beam deflectors intersect in at least one plane before reaching the target.

16. The method for directing the light of claim 15, wherein:
the first zone is the inner concentric zone;
the second zone is the outer concentric zone;
the first set of beam deflectors comprises a first set of pillars, wherein all beam deflectors of the first set of beam deflectors are the same;
the second set of beam deflectors comprises a second set of pillars with a different number of pillars than the first set of pillars; and
all the beam deflectors of the second set of beam deflectors are the same as one another and different than the beam deflectors of the first set of beam deflectors.

17. The method for directing the light of claim 15, wherein:
the first zone is a quadrant of the beam deflector metasurface; and
the second zone comprises second, third, and fourth quadrants of the beam deflector metasurface.

18. The method for directing the light of claim 15, further comprising de-focusing the light passing through the beam deflector metasurface to the target.

19. The method for directing the light of claim 15, wherein the first set of beam deflectors and the second set of beam deflectors are arranged in an r-theta lattice structure.

* * * * *